United States Patent [19]

Vente et al.

[11] 4,313,482
[45] Feb. 2, 1982

[54] PNEUMATIC TIRE AND PROCESS FOR ITS MANUFACTURE

[75] Inventors: Paul Vente, Leverkusen; Richard Juffa, Cologne; Dieter Seidenschnur, Neunkirchen-Seelscheid; Ulrich Knipp, Berg.-Gladbach, all of Fed. Rep. of Germany

[73] Assignee: Bayer Aktiengesellschaft, Leverkusen, Fed. Rep. of Germany

[21] Appl. No.: 849,750

[22] Filed: Nov. 9, 1977

[30] Foreign Application Priority Data

Nov. 13, 1976 [DE] Fed. Rep. of Germany ....... 2651876

[51] Int. Cl.$^3$ .................. B60C 5/00; B60C 13/00
[52] U.S. Cl. .................. 152/330 R; 152/357 A; 152/353 R; 264/250; 264/311
[58] Field of Search ............ 152/353 R, 187, 352–355, 152/330 R, 374, 330 RF, 357 A, 357 R; 156/125, 128; 264/311, 326, 315, 326, 250

[56] References Cited

U.S. PATENT DOCUMENTS

| | | | |
|---|---|---|---|
| 595,422 | 12/1897 | Van Zandt | 152/353 R |
| 957,167 | 5/1910 | Kempshall | 152/353 R |
| 3,283,795 | 11/1966 | Schelkmann | 152/187 |
| 3,464,477 | 9/1969 | Vevdier | 152/353 R |
| 3,578,052 | 5/1971 | Petersons | 152/187 |
| 3,686,389 | 11/1972 | Beneze | 264/250 |
| 3,911,987 | 10/1975 | Takusagawa et al. | 152/353 R |
| 4,064,215 | 12/1977 | Halada et al. | 264/311 |
| 4,177,851 | 12/1979 | Gill et al. | 152/353 R |

Primary Examiner—Leslie J. Paperner
Assistant Examiner—L. E. Williams
Attorney, Agent, or Firm—Gene Harsh; Joseph C. Gil

[57] ABSTRACT

This invention relates to a pneumatic tire comprising a tread surface and two separate side parts of an elastomeric synthetic resin and optionally reinforcing elements, wherein the side part not only forms the side wall of the tire but extends from the rim wire to the mid-line of the tire and therefore also forms the foundation for the tread surface on one side, and to a process for the manufacture of such pneumatic tires.

15 Claims, 14 Drawing Figures

PNEUMATIC TIRE AND PROCESS FOR ITS MANUFACTURE

BACKGROUND OF THE INVENTION

The manufacture of tires is costly in machinery and labor. The processes known for the manufacture of cast tires include the lost core process, the process using a segmented divided core and evacuated mold, the centrifugal casting method and the Zelant Gazuit Bladder method. The present invention relates to tires which can be produced by an economical manufacturing process and yet satisfy the stringent requirements in their use properties. It is intended that the tire should be produced without core molding of the tire tube and that there should be no loss of material in the sprue.

It is another object of the present invention to develop a suitable manufacturing process for such tires.

BRIEF DESCRIPTION OF THE DRAWINGS

Embodiments of the tire according to the invention are shown in FIGS. 1 through 13.

DESCRIPTION OF THE INVENTION

Figure 1:
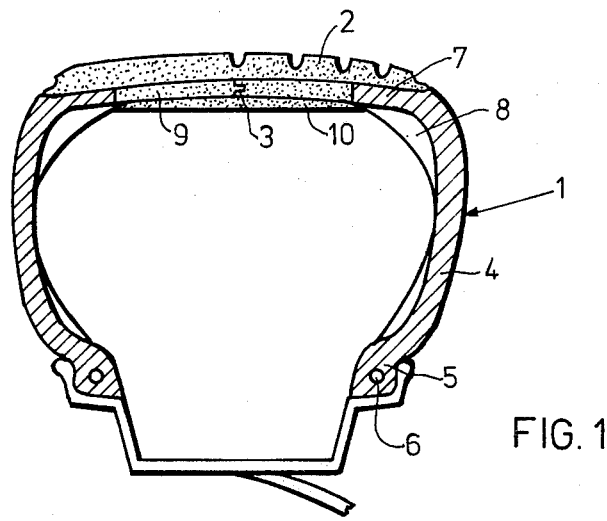
FIG. 1 shows the basic structure of the tire.

The instant invention is directed to a pneumatic tire which is characterized in that the tread surface and a layer under the foundation of the tread surface consist of a tread surface elastomer and in that the tread surface and layer under the foundation for the tread surface are connected through apertures in the foundation of the tread surface. According to the process of the invention, two separately produced side parts, in which reinforcing elements may be inserted in the part forming the foundation for the tread surface, are positioned in a centrifugal mold and an elastomer is fed into the interior of the tire during rotation of the mold, and due to the apertures in the foundation of the tread surface, the elastomer is also distributed in a cavity situated above the tread surfaces in the mold, this cavity being equal in size to the tread surface which is to be formed.

One special advantage of the pneumatic tire according to the invention is its low cost in comparison to its quality, this low cost being due to the economical method of manufacture. The side parts, which could almost be regarded as tire halves since they form not only the side walls with the foot of the tire but also form half the foundation for the tread surface, can easily be manufactured by injection molding, pressure molding, casting or reaction casting processes. They are in many cases produced from polyurethane elastomers due to the advantageous properties of these materials. By virtue of the advantageous methods of manufacture which may be employed, the side walls may be given particularly advantageous forms. It has proved to be advantageous to make the side wall of the side part convex to the outside or to make it alternatively convex, concave and convex in the form of bellows. The performance of the tires under emergency conditions is thereby greatly improved. A further improvement in the emergency characteristics can be obtained if, when constructing the side part in the form of bellows, reinforcing elements are introduced in the circumferential direction of the tire in the region of the concave curvature. Radial ribs situated internally and/or externally in the region of the side walls also improve the emergency characteristics. The apertures may have undercut portions facing each other.

For the sake of easier assembly and greater endurance, the two side parts are equipped with special connecting elements such as tongue and groove joints in the region where they abut against each other and, if necessary, retaining lugs may be provided if armoring elements are to be introduced.

The special advantage of the tire lies in its economic manufacture. The preassembled tire body consisting of two side parts optionally provided with reinforcing elements is introduced into a centrifugal casting mold. While the mold is being rotated, an elastomeric synthetic resin, preferably a polyurethane elastomer, is introduced from the interior of the drum. Bubble-free filling of the cavity can be achieved even if the tread surfaces have a very complicated profile.

When the reaction of the polyurethane materials has been completed, the finished tire is removed from the mold. The time of the operating cycle is almost identical to the pot life of the polyurethane elastomer.

The tire according to the invention is illustrated by way of example in FIGS. 1 to 13. FIG. 14 is a very simplified representation of a centrifugal casting device for the manufacture of such tires.

FIG. 1 shows the basic structure of the tire. Generally speaking, the tire consists of the two separately produced side parts 1 and of the tread surface 2 which may or may not be profiled. The two side parts are connected by a tongue and the groove joint 3. The side part 1 is an integral part which forms not only the side wall 4 of the tire but also the foot 5 of the tire with the rim wire 6 and half the foundation 7 of the tread surface 2. Reinforcing elements 8 (fins cast integral) extending in the radial direction may be provided if desired. 9 indicates an aperture in the foundation of the tread surface 7. The layer 10 consists of the same polyurethane elastomer as the tread surface 2.

Figures 2, 3:
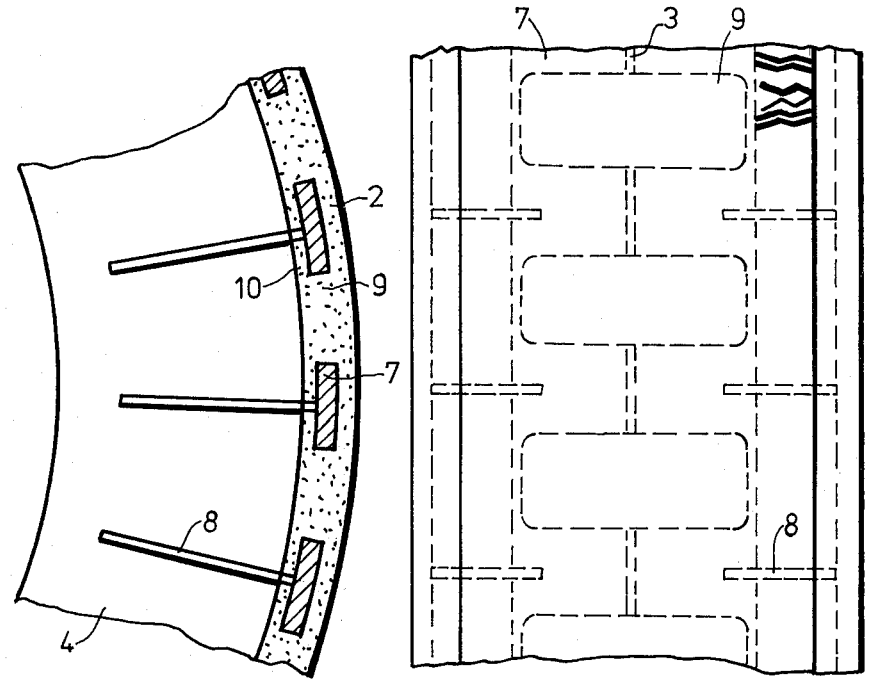
FIG. 2 is a sectional view of the tire of FIG. 1.
FIG. 3 is a top plan view of the tire of FIG. 1.

FIG. 2 is a sectional view of the tire of FIG. 1. The foundation of the tread surface 7 is surrounded on one side by the tread surface 2 which is brought in by the apertures 9. On the other side there is a layer 10 which consists of the same polyurethane elastomer as the tread surface 2. The apertures 9 enable the tread surface 2 to be intimately connected to a layer 10 situated under the foundation for the tread surface 7.

FIG. 3 is a top plan view of the tire of FIG. 1. The apertures 9 in the foundation for the tread surface 7 are shown in broken lines.

Figure 4:
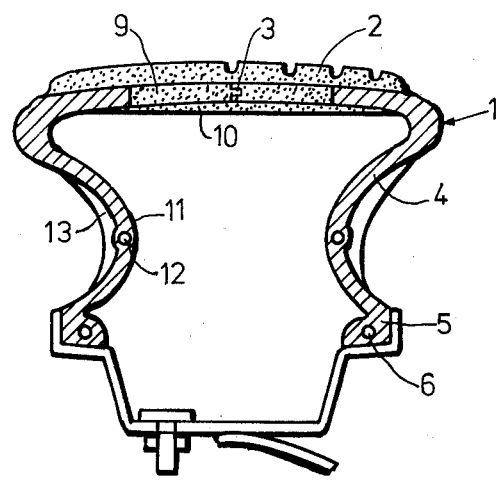
FIG. 4 shows a pneumatic tire according to the invention in which the side walls are convex.

FIG. 4 shows a pneumatic tire according to the invention in which the side walls are convex. A reinforcing element in the form of a steel cable 12 is inserted in the apex of the convex curvature at 11. In this case, radial reinforcing ribs 13 (fins cast integral) are provided externally on the lateral surface. The other reference numerals have the same meaning as in FIGS. 1 to 3.

Figure 5:
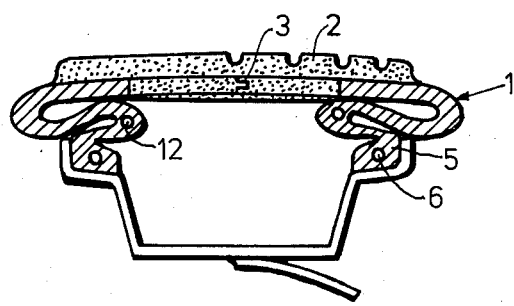
FIG. 5 shows how the tire of FIG. 4 is deformed in an emergency situation.

FIG. 5 shows how the tire of FIG. 4 is deformed in an emergency situation.

Figure 6:
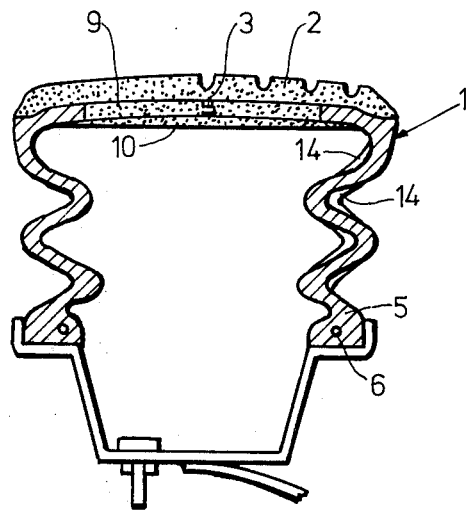
FIG. 6 shows the side wall of the side part folded in the form of bellows.
Figure 7:
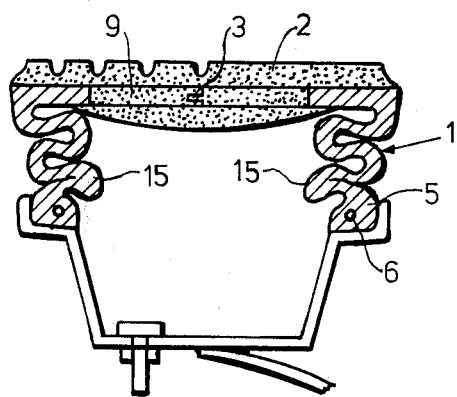
FIG. 7 represents the tire of FIG. 6 in an emergency situation.

In FIG. 6, the side wall 4 of the side part 1 is folded in the form of bellows. In addition, the side wall is reinforced internally and externally by axial ribs (fins cast integral) 14. Due to its high moment of resistance, this tire combines good lateral stability with a high capacity to yield in the radial direction. The axial radius in the section through the tire may be very large since the shoulder pressure is greatly reduced by this capacity to yield. The amount of rolling or squeezing in the region of the tread surface is very slight. FIG. 7 represents the tire of FIG. 6 in an emergency situation. The reference numerals 15 indicate how the axial forces are transmitted to the wheel rim to prevent rapid wear of the tire. The height/width ratio may be reduced to from 0.6 to 0.4.

Figure 8:
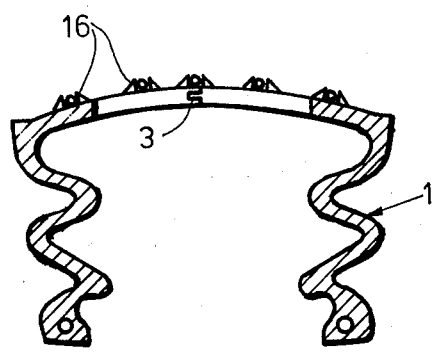
FIG. 8 shows in cross-section and FIG. 9 in top plan view retaining lugs provided on the side parts.
Figure 9:
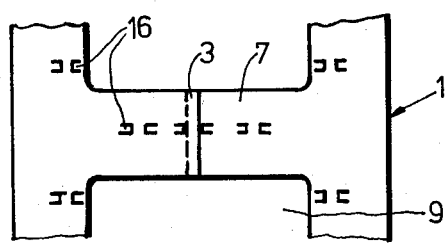

FIG. 8 shows in cross-section and FIG. 9 in top plan view how retaining lugs 16 may be provided on the side parts 1, if necessary, for fixing reinforcements in the region of the tread surface. The retaining lugs may be produced in the same way as the axial ribs.

Figure 10:
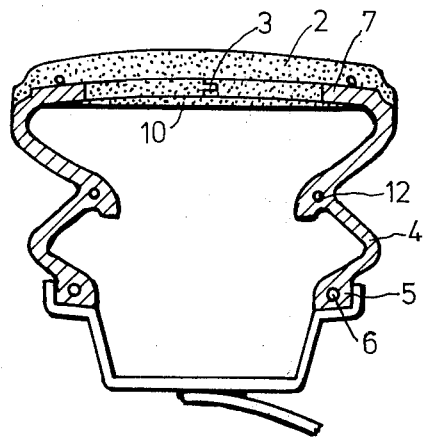
FIG. 10, which is similar to FIG. 4, shows a reduced ratio of height to width.

In the pneumatic tire shown in FIG. 10, which is similar in structure to that of FIG. 4, the ratio of height to width may be reduced to 0.3. A swelling 16 near the reinforcement 12 may clamp the foot of the tire into position in emergency situations.

Figure 12:
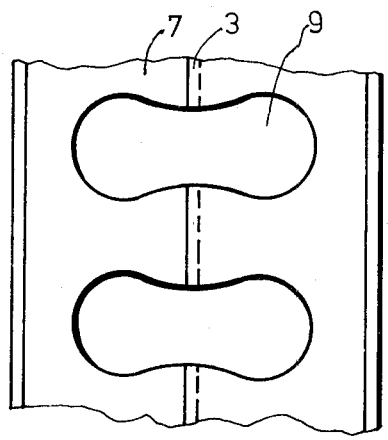
FIGS. 11 to 13 show various forms of apertures for the foundation of tread surfaces.
Figure 11:
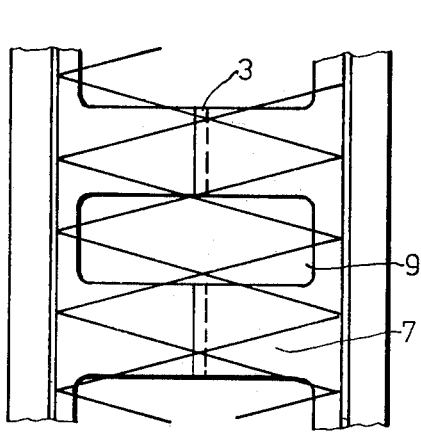
Figure 13:
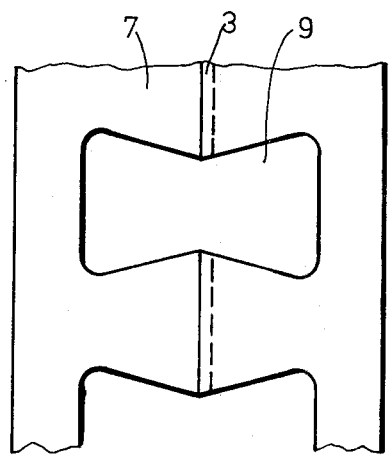
Figure 14:
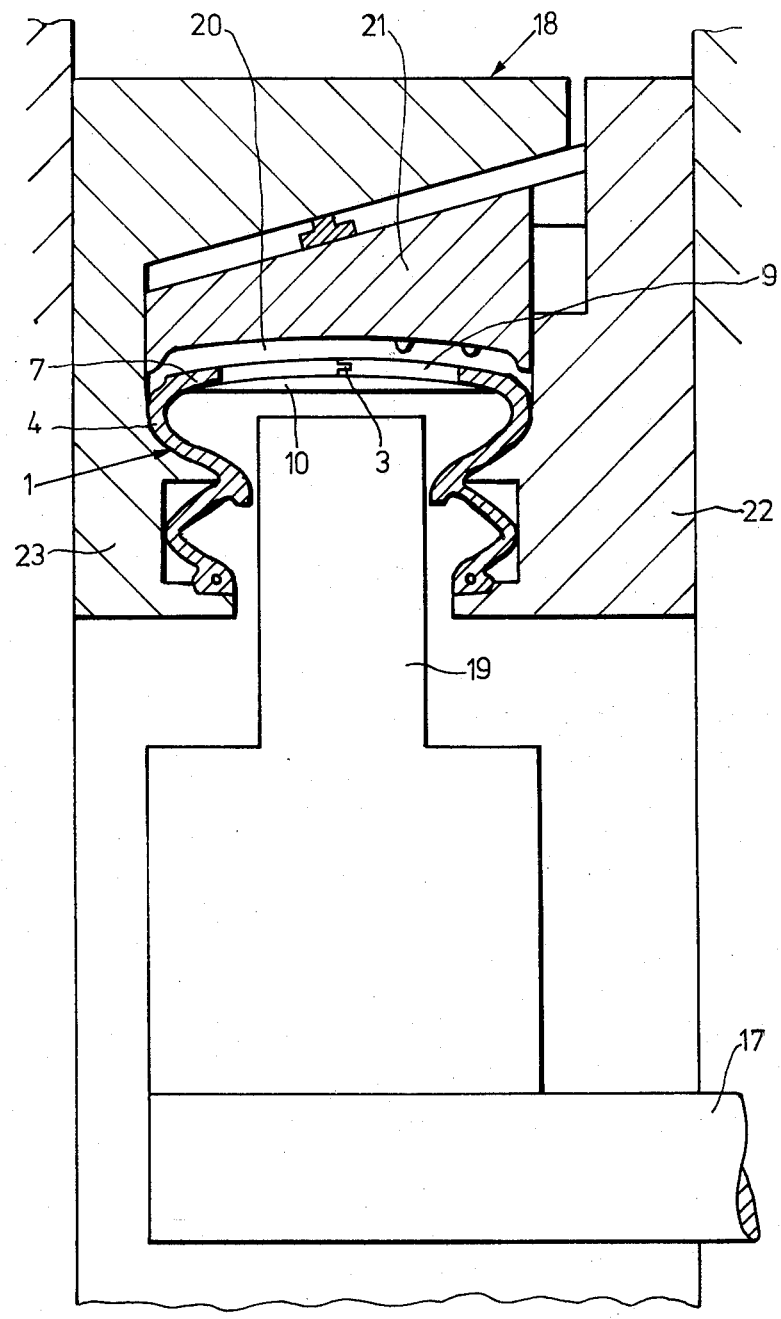
FIG. 14 represents a simplified representation of a centrifugal casting device for the manufacture of such tires.

Possible forms of apertures 9 in the foundation for the tread surface 7 are shown in FIGS. 11 to 13.

An apparatus for the manufacture of the tires according to the invention is shown in FIG. 14. The two side parts 1 are placed in position in a mold 18 which rotates about a shaft 17. The tongue and groove joint 3 along the mid-line under the tread surface provides a stable connection. During rotation of the mold, polyurethane elastomer is cast on the inner surface of the underside of the tread surface 7 from the mixing head 19. Due to the presence of the apertures 9 on the underside of the tread surface 7, the polyurethane elastomer mixture also enters the cavity 20 above the underside of the tread surface 7. The size of this cavity 20 is equal to that of the desired tread surface 2. By suitably shaping the upper surface, the desired profile can be imparted to the tread surface 2. The tread surface can be produced free from bubbles. A sufficient quantity of polyurethane elastomer mixture is introduced so that a layer 10 is also formed on the underside of the tread surface 7. This layer 10, like the tread surface 2 is bonded to the side part 1 in the region of the underside of the tread surface 7. When the polyurethane material has completed its reaction, the mold 18 is opened, the segmented tread surface matrix 21, supported conically, is opened while the two plates 22 and 23 which serve to hold the molded article are moved apart, and the finished pneumatic tire which is free from sprue marks can be removed.

What is claimed is:

1. A pneumatic tire comprising a tread surface and two separate side parts of an elastomeric synthetic resin, wherein the side parts not only form the side walls of the tire but each extends from a rim wire to the midline of the tire and therefore also forms the foundation for the tread surface of each side of the tire, characterized in that
   (a) the tread surface and a layer under the foundation of the tread surface consist of a tread surface elastomer and
   (b) the tread surface and layer under the foundation of the tread surface are joined through apertures in the foundation of the tread surface.

2. The pneumatic tire of claim 1, characterized in that the tread surface and the side parts consist of polyurethane.

3. The pneumatic tire of claim 1, characterized in that said side parts are joined together in the midline under the tread surface.

4. The pneumatic tire of claim 3, wherein said side parts are joined in the midline under the tread surface by tongue and groove.

5. The pneumatic tire according to claim 1, characterized in that the side walls of said side parts are convex on the external surface.

6. The pneumatic tire of claim 4, characterized in that the side parts have radial ribs in the region of the side walls.

7. The pneumatic tire of claim 6, characterized in that the side parts have radial spacer ribs on the inside in the region of the rim ring.

8. A pneumatic tire of claim 1, wherein said side walls are alternatively convex, concave and convex in the manner of bellows.

9. The pneumatic tire of claim 8, characterized in that when said side parts are constructed in the form of bellows, reinforcing elements are provided in the circumferential direction of the tire in the region of the concave curvature.

10. The pneumatic tire of claim 9, characterized in that said reinforcing elements are selected from the group consisting of steel cord, glass fibers, and synthetic fibers.

11. The pneumatic tire of claim 1, characterized in that the apertures in said foundation of said tread surface are saw toothed in shape.

12. The pneumatic tire of claim 1, characterized in that said apertures have undercut portions facing each other.

13. The pneumatic tire of claim 1, further comprising reinforcing elements.

14. The pneumatic tire of claim 1, wherein said apertures in the foundation of said tread surface are meandering in shape.

15. The process for the manufacture of pneumatic tires, characterized in that two separately produced side parts which may have armoring elements placed on the foundation of their tread surface, are positioned in a centrifugal mold and an elastomer is fed into the interior of the tire during rotation of the mold, which elastomer, due to apertures in the foundation of the tread surface formed by the side parts is also distributed in a cavity provided in the mold above the foundation for the tread surface, the said cavity having the shape of the tread surface which is to be formed.

* * * * *